(12) United States Patent
Horn

(10) Patent No.: US 7,158,361 B2
(45) Date of Patent: Jan. 2, 2007

(54) METHOD AND APPARATUS FOR REGULATING A CURRENT THROUGH AN INDUCTIVE LOAD

(75) Inventor: Wolfgang Horn, Klagenfurt (AT)

(73) Assignee: Infineon Technologies AG, Munich (DE)

( * ) Notice: Subject to any disclaimer, the term of this patent is extended or adjusted under 35 U.S.C. 154(b) by 84 days.

(21) Appl. No.: 11/073,432

(22) Filed: Mar. 4, 2005

(65) Prior Publication Data
US 2005/0206356 A1    Sep. 22, 2005

(30) Foreign Application Priority Data
Mar. 5, 2004  (DE) .................... 10 2004 010 914

(51) Int. Cl.
*H01H 47/32* (2006.01)
*F02P 3/05* (2006.01)

(52) U.S. Cl. .................. 361/154; 361/152; 123/490

(58) Field of Classification Search ............ 361/154, 361/152; 123/490; 323/271
See application file for complete search history.

(56) References Cited
U.S. PATENT DOCUMENTS
4,585,986 A * 4/1986 Dyer ........................ 323/271
4,944,281 A * 7/1990 Suquet ...................... 123/644
5,038,247 A * 8/1991 Kelley et al. ............... 361/154
5,708,578 A * 1/1998 Stoddard et al. ............. 363/98

\* cited by examiner

*Primary Examiner*—Bao Q. Vu
(74) *Attorney, Agent, or Firm*—Maginot, Moore & Beck

(57) ABSTRACT

The invention relates to a method and an apparatus for regulating a current through an inductive load, which can be connected to a power supply, to a prescribed nominal current value, where the method comprises the following method steps:

a) turning on and off the power supply in pulsed fashion, with the power supply being turned on when the current (I) flowing through the load (L) reaches a first limit value (I_1), which is below the nominal current value (I_nominal) by a hysteresis value (H), and with the power supply being turned off when the current (I) reaches a second limit value (I_2), which is above the nominal current value (I_nominal) by the hysteresis value (H), b) determining a period duration between two successive turn-on or turn-off times, c) comprising determined the period duration with a given period duration (Tnominal), and d) changing the hysteresis value (H) on the basis of the comparison between the determined period duration and the prescribed period duration (Tnominal).

20 Claims, 7 Drawing Sheets

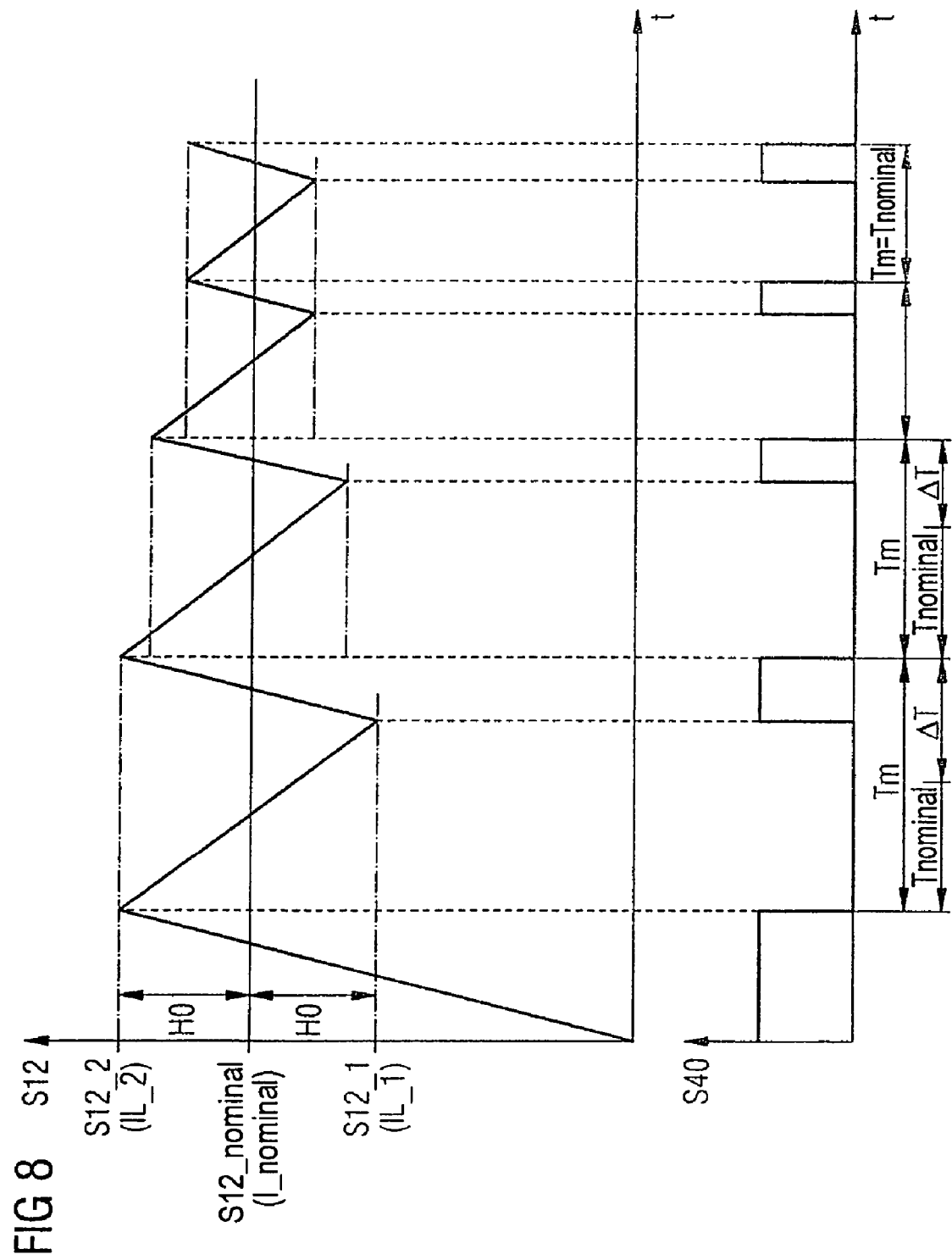

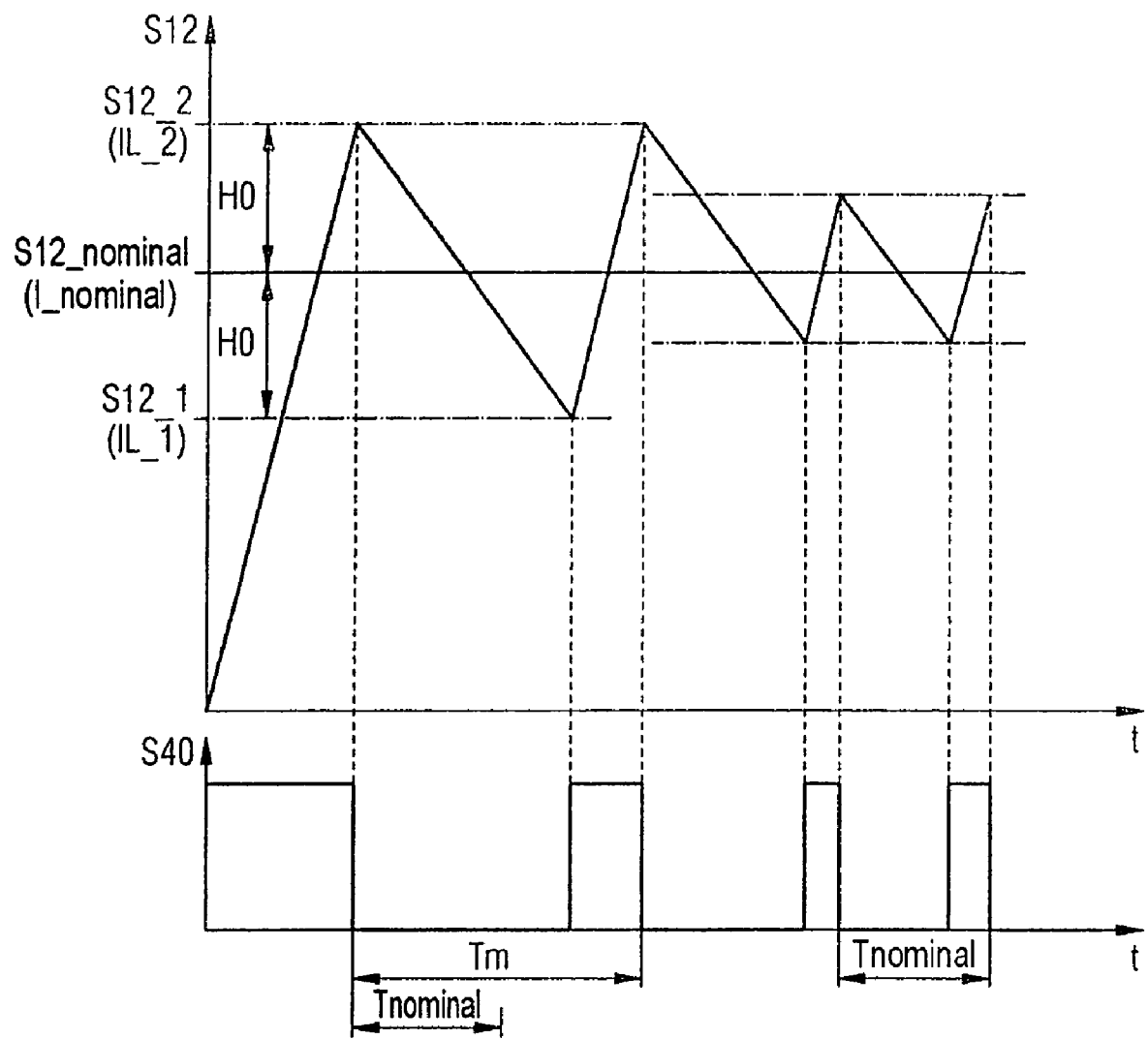

METHOD AND APPARATUS FOR REGULATING A CURRENT THROUGH AN INDUCTIVE LOAD

FIELD OF THE INVENTION

The present invention relates to a method and an apparatus for regulating a current flowing through an inductive load.

BACKGROUND

FIG. 1 shows a circuit arrangement having an inductive load, which is represented by an inductance L and an ohmic resistor R, and shows a current regulating arrangement for regulating a current IL through the load. This current regulating arrangement comprises a switch S which is connected in series with the load and which is used for connecting the load to a supply voltage V in pulsed fashion. With the switch closed, when approximately all of the supply voltage is present across the load, the current through the load rises in a sufficiently well known manner and falls when the switch S is opened, with the current through the load when the switch is opened being accepted by a freewheeling diode FWD which is connected in parallel with the load.

To determine the current drawn by the load, the load current is detected using a measuring resistor RS which is connected in series with the load and which is connected to an actuating circuit 2. This actuating circuit uses an actuation signal 21 to actuate the switch S on the basis of the voltage Vrs across the current measuring resistor RS, and hence on the basis of the load current IL, with the aim of regulating the mean value of the load current to a prescribed value.

To regulate the mean value of the load current IL to a nominal value I_nominal using a current regulating arrangement as shown in FIG. 1, two concepts are fundamentally known which are explained below with reference to FIGS. 2 and 3. The two figures show, by way of example, the respective time profile for the load current IL and for the actuation signal 21 for the respective method. For the illustration in FIGS. 2 and 3, it is assumed, in order to assist understanding, that the inductive load is an ideal inductance, which means that a triangular current profile is obtained when the switch S is turned on and off in pulsed fashion.

In the method illustrated with reference to FIG. 2, the switch S is respectively turned on when the load current IL has dropped to a lower limit value I_1, which is below the nominal value I_nominal by a firmly prescribed hysteresis value H, and turned off when the load current has risen to an upper limit value I_2, which is above the nominal value I_nominal by the hysteresis value H. In the case of this method, the hysteresis in the load current IL is constant after the upper limit value I_2 has been reached for the first time, and corresponds to twice the hysteresis value H.

The gradient with which the load current IL rises when the switch S is turned on is dependent on the supply voltage V to which the load is connected in pulsed fashion. In this case, the gradient of the load current IL increases as the supply voltage increases, which results in a shortening of the turned-on period and hence in an increase in the switching frequency, which is shown using the right-hand part of the time profiles in FIG. 2, in which the time profile of the load current IL and of the actuation signal is shown for a relatively high supply voltage V. By contrast, the gradient of the current IL when the switch is opened is essentially independent of the supply voltage.

In the case of the method explained with reference to FIG. 2, the switching frequency is very highly dependent on the characteristics of the load, of the switch S, of the freewheeling diode FWD, of the temperature and particularly of the supply voltage V. Since the switching losses in the switch S are dependent on the switching frequency, the switch S needs to be proportioned, for safety reasons, such that it is able to take on the high power losses which arise at high switching frequencies, which increases the manufacturing costs for the switch. Furthermore, the frequency of electromagnetic radiated interference resulting from the switching processes likewise fluctuates over a wide range in the case of this method, which makes it more difficult to suppress the propagation of this radiated interference.

In the case of the method illustrated with reference to FIG. 3, the switch is turned on at the rate of a firmly prescribed frequency. To set the turned-on period for the switch, the mean value of the load current IL is determined over one or more previous actuation periods and is compared with the nominal value I_nominal. In this case, the turned-on period is adapted on the basis of the determined comparison result, that is to say is increased in comparison with the previous value if the determined mean value is below the nominal value I_nominal and is reduced in comparison with the previous value if the determined mean value is above the nominal value I_nominal. The turned-on period can be regulated digitally or in analog fashion, for example using a proportional integral controller (PI controller).

A drawback of this method is that the transient response is worse than in the method with constant hysteresis. Furthermore, suitable proportioning of the control loop in order to attain sufficient stability is difficult and complex.

SUMMARY

It is an aim of the present invention to provide a method for regulating the mean value of a current flowing through an inductive load in which the power loss resulting from switching processes is subject to only small fluctuations and which can be implemented easily and without stability problems, and to provide an apparatus for implementing a method of this type.

The method for regulating the mean value of a load current through an inductive load, which can be connected to a supply voltage, to a prescribed nominal current value involves the power supply being turned on and off in pulsed fashion, with the power supply being turned on when the current flowing through the load reaches a first limit value, which is below the nominal current value by a hysteresis value, and with the power supply being turned off when the current reaches a second limit value, which is above the nominal current value by the hysteresis value, determining a period duration between two successive turn-on or turn-off times, comparing the determined actual period duration with a nominal period duration, and changing the hysteresis value on the basis of the comparison between the actual period duration and the nominal period duration.

In the case of the inventive method, the controlled variable is the period duration which is determined and whose value is compared with the nominal period duration. The manipulated variable is the hysteresis value, which is changed on the basis of the comparison result in order to regulate the period duration to the value of the nominal period duration. This nominal value for the period duration is reached after a transient process, whose duration is dependent not only on the parameters of the control loop but also, inter alia, on the load, on the supply voltage and on the temperature.

In the text below "turned-on phase of the load" is to be understood to mean a period of time during which the switch is turned on and off in pulsed fashion in order to effect a current with a regulated mean value through the load. At the start of such a turned-on phase, when the current through the load is initially still zero, a fixed initial value for the hysteresis value is preferably prescribed which is subsequently changed on the basis of the comparison between the actual period duration and the nominal period duration in order to regulate the period duration to the value of the nominal period duration. Furthermore, it is also possible to store a hysteresis value at the end of an earlier turned-on phase and to use this stored value as initial value for a later turned-on phase.

To regulate the hysteresis value on the basis of the comparison between the actual period duration and the nominal period duration, it is possible to set the hysteresis value using an integrating control method (I control) or a proportional/integrating control method (PI control). The difference between the actual period duration and the nominal period duration determines the control error in this case. The amount by which the hysteresis value is changed after each comparison between the actual period duration and the nominal period duration can be dependent on the control error in this case. It is also possible for the hysteresis value, after each comparison, always to be incremented or decremented by a prescribed value on the basis of advantages of the control error, so long as the control error is greater than zero.

In addition, the hysteresis value for reaching the nominal period duration may also be determined analytically using the actual period duration, the nominal period duration and the instantaneous hysteresis value, provided that the load current rises in linear fashion when the switch is closed and falls in linear fashion when the switch is opened, that is to say provided that the current has a triangular profile.

The apparatus for regulating the mean value of a current through an inductive load to a prescribed nominal current value comprises a controllable power supply circuit to which an actuation signal is supplied and which provides the supply voltage as stipulated by the actuation signal, a current measuring arrangement for measuring the current flowing through the load and for providing a current measurement signal. The apparatus also comprises an actuating circuit to which a hysteresis value, the current measurement signal and the nominal current value are supplied and which provides the actuation signal such that the supply voltage is turned on when the current measurement signal reaches a first limit value, which is below the nominal value by the hysteresis value, and is turned off when the current measurement signal reaches a second limit value, which is above the nominal current value by the hysteresis value. The apparatus also comprises a time measuring arrangement for determining a period duration for an actuation period in the power supply circuit and for providing a period duration value which is dependent on the actuation period, and also an evaluation circuit to which a nominal period duration value, the determined actual period duration value and a previous hysteresis value determined during a previous period are supplied and which is designed to set the hysteresis value on the basis of the nominal period duration value, the determined actual period duration value and the previous hysteresis value.

The power supply circuit for providing the supply voltage comprises a voltage source and a switch, for example, with the switch being connected in series with the load between connection terminals on the voltage source and being actuated by the actuation signal. It goes without saying that any other switchable voltage sources can be used for supplying the load.

By way of example, the current measuring arrangement comprises a measuring resistor, which is connected in series with the load, and a measuring amplifier, which detects a voltage drop that is present across the measuring resistor and is brought about by the load current and which provides the current measurement signal on the basis of this voltage drop.

BRIEF DESCRIPTION OF THE DRAWINGS

The present invention is explained in more detail below using exemplary embodiments with reference to figures.

FIG. 8 illustrates the profile of the load current and of the actuation signal when using a regulator arrangement with an integrating control response.

FIG. 9 illustrates the profile of the load current and of the actuation signal when using a regulator arrangement which calculates a hysteresis value analytically using a measured period duration value, a nominal period duration value and an instantaneous value for the hysteresis value.

Unless indicated otherwise, identical reference symbols in the figures denote identical parts having identical meanings.

DETAILED DESCRIPTION

Figure 1:
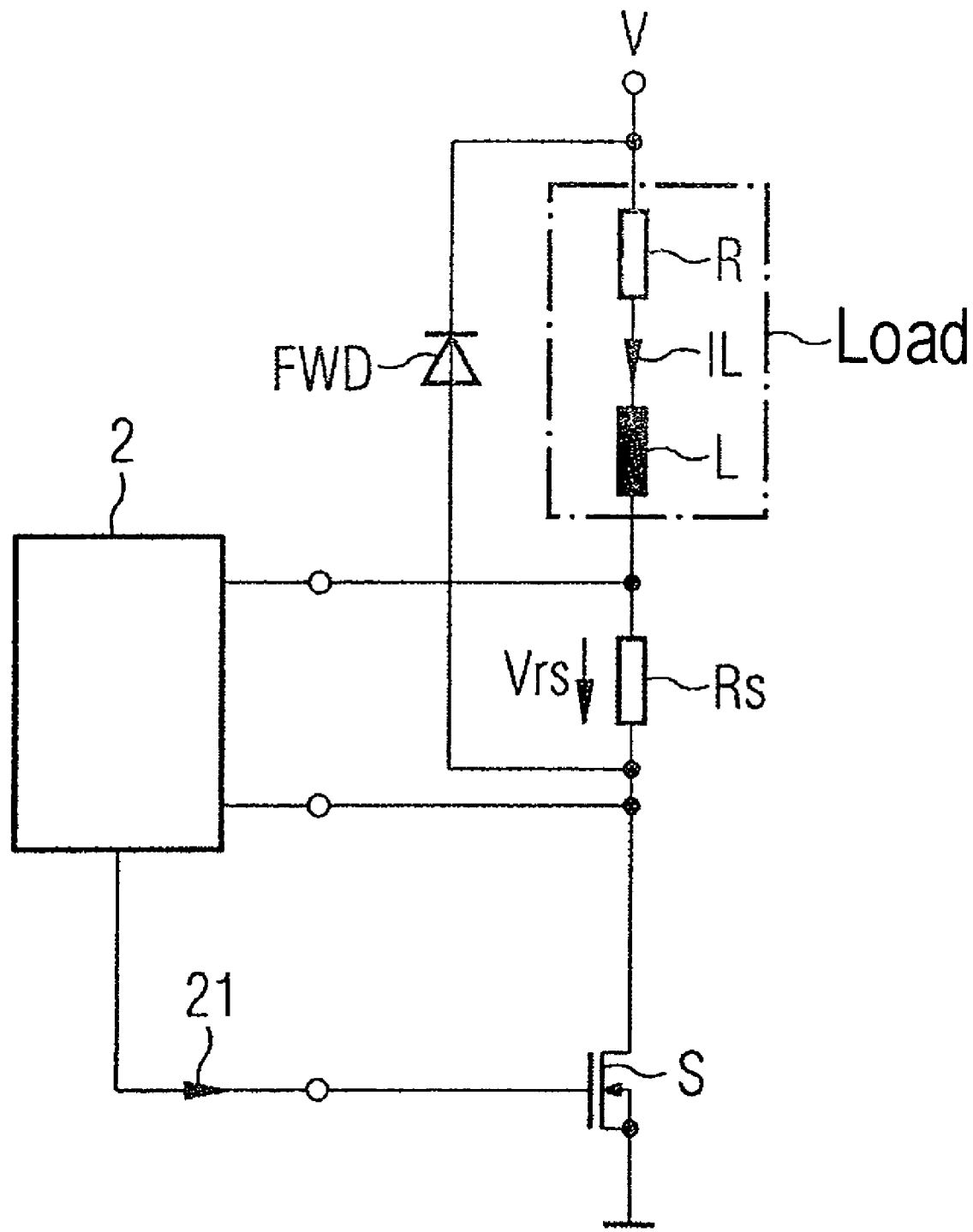
FIG. 1 shows a circuit arrangement with an inductive load and a current regulator based on the prior art.
Figure 2:
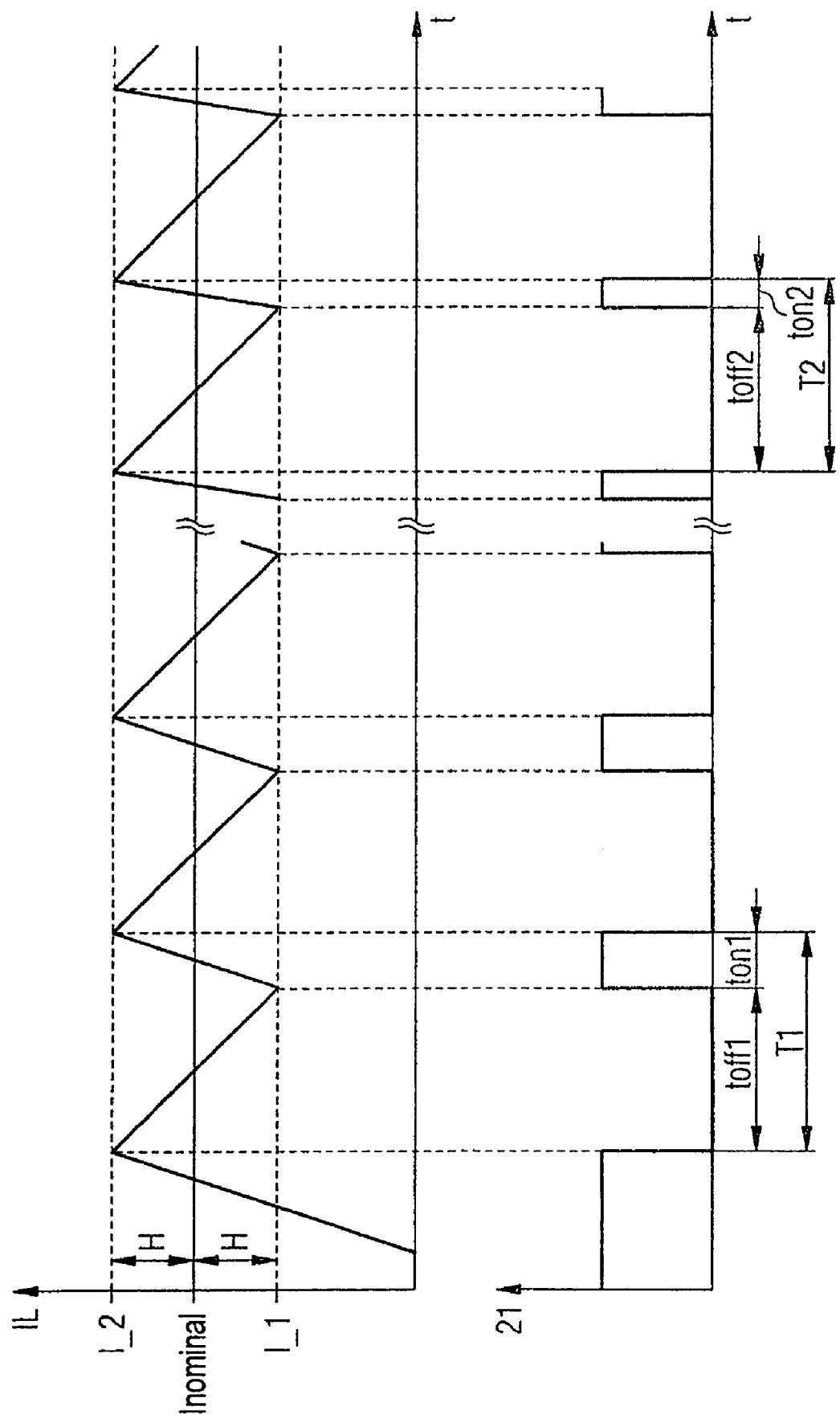
FIG. 2 shows the time profile of the load current (FIG. 2a) and of an actuation signal for the power supply to the load (FIG. 2b) in the case of a method based on the prior art, in which a constant hysteresis for the load current profile is set.
Figure 3:
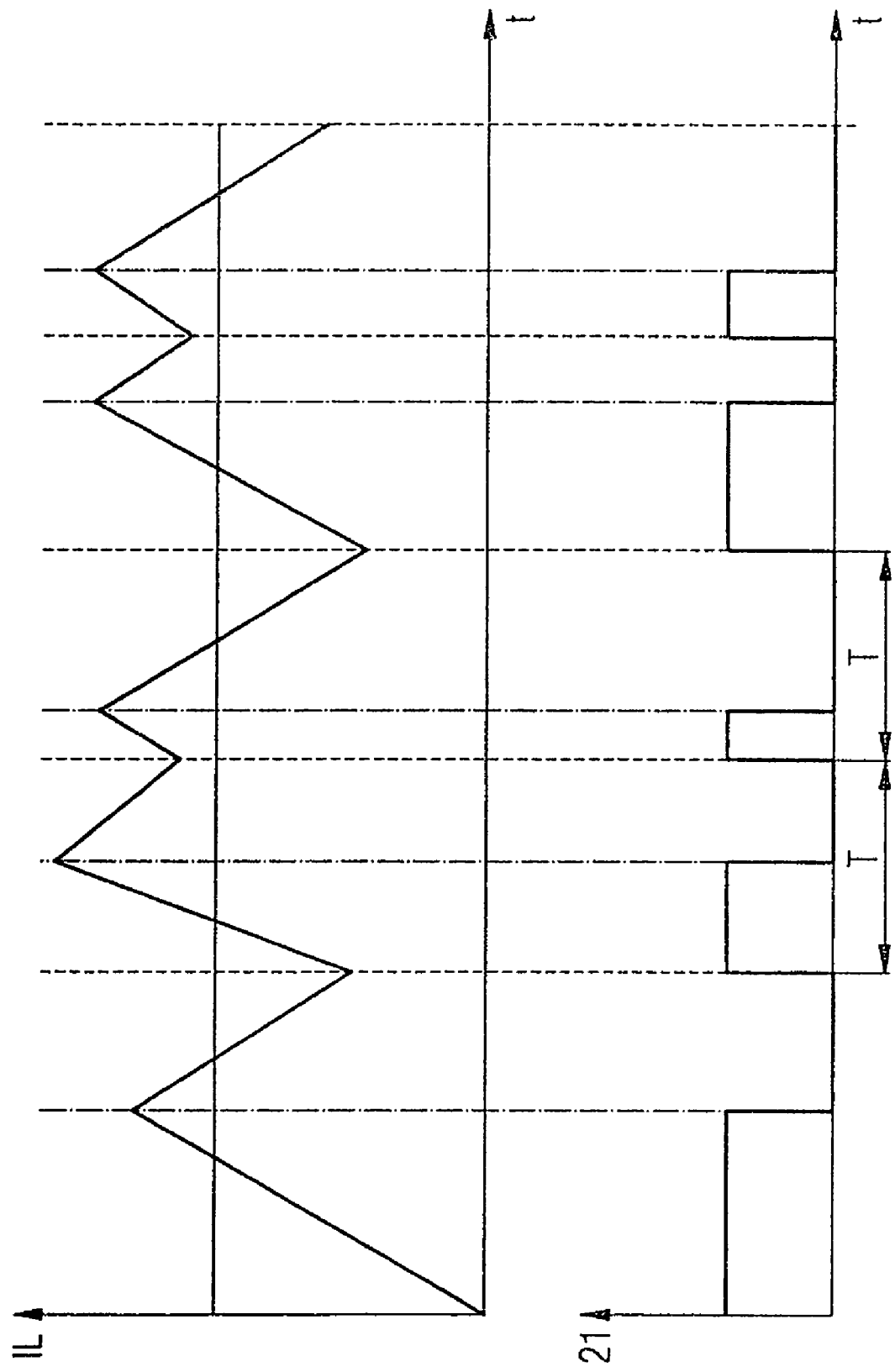
FIG. 3 illustrates the time profile of the load current (FIG. 3a) and of an actuation signal for the power supply to the load (FIG. 3b) in the case of a method based on the prior art, in which the power supply is turned on at a fixed frequency.
Figure 4:
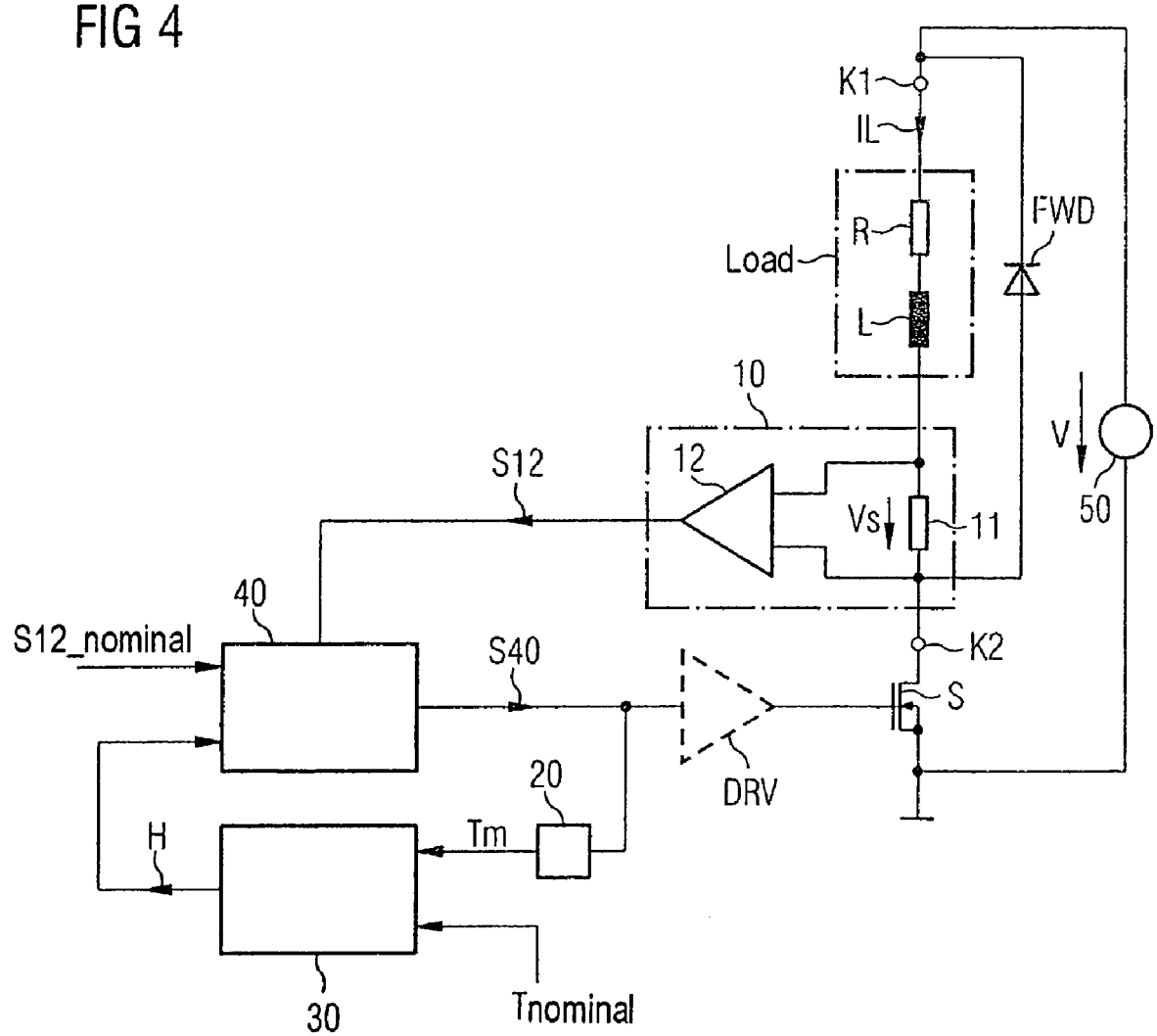
FIG. 4 shows an exemplary embodiment of an inventive current regulator for regulating the mean value of a load current to a nominal value, which has an actuating circuit for generating an actuation signal for a voltage source and a regulator arrangement for setting a hysteresis value.

FIG. 4 shows a circuit arrangement with a load RL and an inventive current regulating arrangement for regulating the mean value of a load current IL to a prescribed nominal value. The current regulating arrangement comprises a controllable voltage source with connection terminals K1, K2 for connecting the load. In the exemplary embodiment shown, the controllable voltage source comprises a constant voltage source 50, which provides a supply voltage V, and a switch S which is actuated as stipulated by an actuation signal S40 and which connects the load to the voltage source 50 in the closed state and breaks a conductive connection between the voltage source and the load in the open state. The switch S is in the form of a MOS transistor, for example.

The current regulating arrangement also comprises a current measuring arrangement 10 with a current measuring resistor 11, which is connected in series with the load R,L, and with a current measuring amplifier 12, which taps off a measured voltage Vs that is present across the current measuring resistor 11 and results from the load current IL and which provides a current measurement signal S12 which is dependent on the load current IL. The current measuring amplifier 12 comprises, in particular, a level shifter which ensures that the current measurement signal S12 is always referenced to a reference-ground potential regardless of the switch position of the switch S. This level shifter arrangement is necessary because the potential at the node which is common to the current measuring resistor 11 and to the switch S fluctuates between reference-ground potential GND, with the switch S closed, and the supply voltage V, with the switch S open.

To provide the actuation signal S40 for the switch S, the current regulating arrangement has an actuating circuit 40 to which the current measurement signal S12, a nominal current value Inominal and a hysteresis value H are supplied. The actuation signal S40 which is available at the output of the actuating circuit 40 is preferably converted to a level suitable for actuating the switch S from a logic level by a driver circuit DRV. The actuating circuit 40 is designed to generate a pulsed actuation signal S40 for the switch S on the basis of the current measurement signal S12, the nominal current value Inominal and the hysteresis value H, the switch S being closed during one period duration of this pulsed actuation signal S40 for a respective prescribed period of time S, in order to apply the load to the supply voltage V, and then being opened by the start of the next actuation period.

In addition, the current regulating arrangement comprises a time measuring arrangement 20 to which the actuation signal S40 is supplied and which provides a time measuring signal Tm that is dependent on a period duration of this actuation signal S40 and preferably corresponds to the period duration of the actuation signal S40. However, the time measuring arrangement 20 may also be designed such that the time measurement value Tm corresponds to the turned-on period or to the turned-off period of the actuation signal S40, where "turned-on period" denotes the period of time during which the actuation signal S40 is at a level which is suitable for turning on the switch S, and "turned-off period" denotes the period of time during which the actuation signal S40 is at a level which is suitable for turning it off.

This time measurement value Tm is supplied to a regulator arrangement 30 to which, besides this time measurement value Tm, a nominal time value Tnominal is supplied which represents a nominal value for the time measurement value Tm. Depending on whether the time measurement value Tm corresponds to the period duration of the actuation signal S40, the turned-on period or the turned-off period of the actuation signal S40, this nominal value Tnominal is chosen such that it corresponds to a nominal value for the actuation period, for the turned-on period or for the turned-off period of the actuation signal S40. The actuation signal S40 is regulated on the basis of a time measurement value using a hysteresis value H which the regulating arrangement 30 generates on the basis of a comparison between the time measurement value Tm and the nominal time value Tnominal and which is supplied to the actuating circuit 40. The aim of regulating the actuation signal S40 on the basis of the actuation period, the turned-on period or turned-off period is to set a prescribed period duration and hence a prescribed switching frequency for the switch S.

With the switch S closed, the load current IL rises, and the load current IL falls when the switch S is subsequently opened, when the load current IL is accepted by the free-wheeling diode FWD. The current measurement signal, which is proportional to the load current, behaves accordingly. The actuation signal S40 for the switch S is in this case generated, with reference to FIG. 7, such that, after closing, the switch S remains closed until the current measurement signal S12 reaches an upper limit value S12_2, which corresponds to the sum of a nominal value S12_nominal and a hysteresis value H, and, after opening, the switch S remains open until the current measurement signal S12 has fallen to a lower limit value S12_1, which corresponds to the nominal value S12_nominal minus the hysteresis value H. The current measuring resistor 11 and the current measuring amplifier 12 are preferably tuned to one another such that the current measurement signal S12 is proportional to the load current IL. The load current which flows when the switch S is turned off is then correspondingly proportional to the upper limit value S12_2, the load current which flows when the switch S is turned on is then proportional to the lower limit value S12_1, and the hysteresis by which the load current fluctuates is proportional to twice the hysteresis value H'. The nominal value S12_nominal is suitably chosen, taking into account the proportionality factor introduced by the current measuring arrangement 10, in order to regulate the mean value of the load current to a prescribed nominal value.

Figure 5:
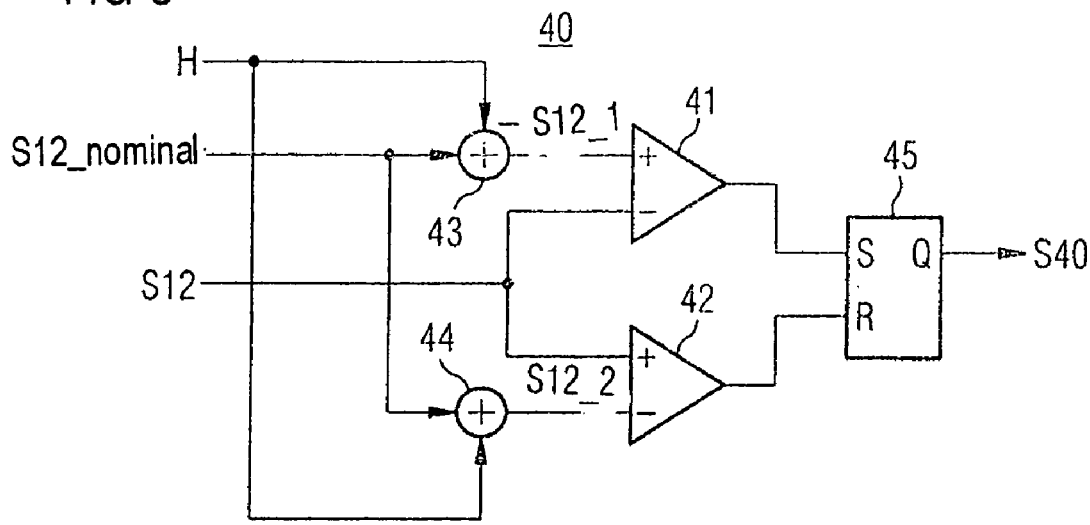
FIG. 5 shows a first exemplary embodiment of the actuating circuit.

FIG. 5 shows a first exemplary implementation of the circuitry of the actuating circuit, which generates the actuation signal S40 on the basis of the hysteresis value H, the nominal value S12_nominal and the current measurement signal S12. The circuit arrangement comprises a first and a second comparator 41, 42, an RS-type flipflop 45 connected downstream of the comparators 41, 42, and also a subtractor 43 and an adder 44. The subtractor 43, to which the nominal current value S12_nominal and the hysteresis value H are supplied, provides the lower limit value S12_1, which is supplied to the positive input of the first comparator 41. The second input of this first comparator 41 is supplied with the current measurement signal S12. The adder 44, to which the nominal current value S12_nominal and the hysteresis value H are supplied, provides the upper limit value S12_2, which is supplied to the negative input of the second comparator 42. The positive input of this second comparator 42 is supplied with the current measurement signal S12. The flipflop 45 is set upon a rising edge at the output of the first comparator 41, that is to say when the current measurement signal S12 has dropped below the lower limit value S12_1, in order to generate a high level for the actuation signal S40 and to turn on the switch S. The flipflop is reset upon a rising edge of the output signal from the second comparator 42, that is to say when the current measurement signal S12 exceeds the value of the upper limit value S12_2.

Figure 7:
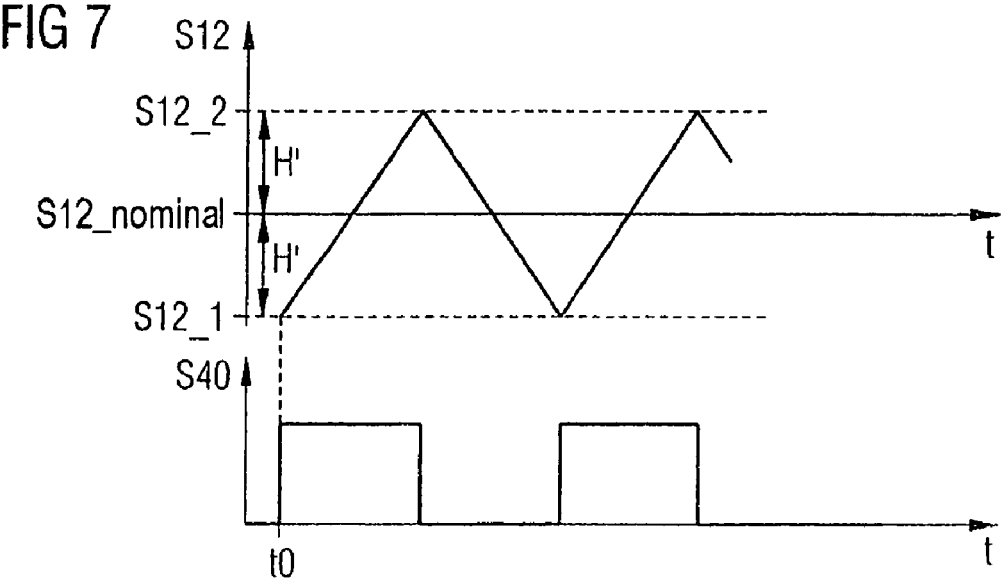
FIG. 7 illustrates the way in which the actuating circuit works.

The time profiles of the signals which arise in the actuating circuit become clear from the time profiles in FIG. 7. In the illustration in FIG. 7, the switch S is closed by a high level from the actuation signal S40 at a time t0, as a result of which the load current IL and the current measurement signal S12 rise. In this case, the actuation signal S40 remains at a high level until the current measurement signal reaches the second limit value S12_2, whereupon the flipflop 45 is reset by means of the second comparator 42 in order to bring about a low level for the actuation signal S40 and to open the switch S as a result. The switch remains open until the current measurement signal S12 has dropped to the first limit value S12_1, whereupon the flipflop 45 is set again by means of the first comparator 41 in order to generate a high level for the actuation signal S40 and to close the switch S.

Figure 6:
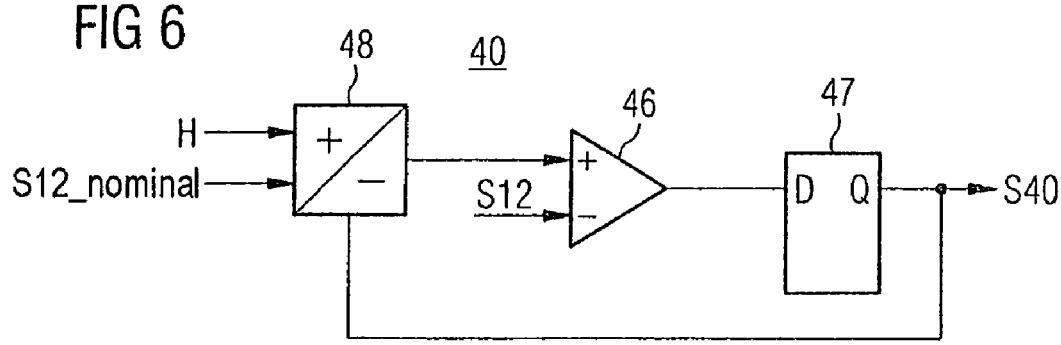
FIG. 6 shows a second exemplary embodiment of the actuating circuit.

FIG. 6 shows a further exemplary embodiment of the actuating circuit 40, which has merely a comparator 46, a D-type flipflop 47 and an addition/subtraction circuit. In this case, the addition/subtraction circuit 48 is supplied with the nominal value S12_nominal and the hysteresis value H, and this circuit 48 adds the hysteresis value H to the nominal current value S12_nominal or subtracts the hysteresis value from this nominal current value S12_nominal as stipulated by the actuation signal S40. The output value from this addition/subtraction circuit is supplied to the positive input of the comparator 46, whose negative input is supplied with the current measurement signal S12. The comparator output signal actuates the D input of the D-type flipflop 47. The addition/subtraction circuit 48 is designed to add the hysteresis value H to the nominal value S12_nominal when the actuation signal S40 is at a high level, in order to provide the upper limit value S12_2. In this case, the actuation signal S40 retains a high level until the current measurement signal S12 has risen to this second limit value S12_2 and the actuation signal from the comparator 46 assumes a low level. The D-type flipflop 47 accepts the output signal from the comparator 46, which means that the actuation signal S40 assumes a low level. When the actuation signal S40 is at a low level, the addition/subtraction circuit subtracts the hysteresis value H from the nominal value S12_nominal in order to provide the lower limit value S12_1. The comparator output signal 46, and hence the actuation signal S40, then remain at a low level until the current measurement signal S12 has dropped to the first limit value S12_1.

It is an aim of the present current regulating arrangement to achieve an at least approximately constant switching frequency for the switch S after a transient process. This is achieved in the current regulating arrangement by varying the hysteresis value H on the basis of a comparison between the time measurement value Tm and the nominal time value Tnominal, as explained below with reference to FIG. 8.

FIG. 8 illustrates a transient process for the current measurement signal S12, which is proportional to the load current IL, after a time t1. On account of the proportionality between the current measurement signal S12 and the load current IL, the current measurement signal's time profile shown in FIG. 8 corresponds in quality to the time profile of the load current IL. The values assumed by the load current at the different times in the time profile shown in FIG. 8 are indicated in brackets. In this case, the upper limit value IL_2 of the load current corresponds to the upper limit value S12_2, a lower limit value for the load current corresponds to the lower limit value S12_1, and the load current's mean value I_nominal which is set corresponds to the nominal value S12_nominal. The time t1 in FIG. 8 denotes a time at which the switch S is closed after the inductive load has been fully demagnetized. In this context, the regulating arrangement 30 first of all supplies an initial value H0 for the hysteresis value H to the actuating circuit 40. The switch S remains closed at first until the current measurement signal S12 reaches the upper limit value S12_2 for the first time at a time t2. From this time t2 onward, the switch is opened whenever the current measurement signal S12 reaches the upper limit value S12_2 and is then closed again whenever the current measurement value S12 has dropped to the lower limit value S12_1. The hysteresis value H, and hence the limit values S12_1, S12_2, which are situated symmetrically around the nominal current value S12_nominal are varied in order to set the switching frequency, as becomes clear, in particular, from the time profile of the actuation signal S40 in FIG. 8. The aim is to regulate the period duration of the actuation signal S40 to a nominal period duration value Tnominal, and hence to regulate the switching frequency to a nominal frequency Fnominal. To this end, the regulating arrangement 30 compares the time measurement value Tm and the nominal value Tnominal with one another in order to readjust the hysteresis value H if there is a discrepancy between the measured period duration value Tm and the nominal value Tnominal. This readjustment is illustrated schematically in FIG. 8. In the exemplary embodiment shown, the period duration is greater than the nominal period duration at first, which means that the actual period duration Tm is greater than the nominal period duration value by the value of a control error ΔT. The regulating arrangement 30 is designed to reduce the hysteresis value H in the event of such a control error, so as to reduce the hysteresis of the current measurement signal S12, and hence of the load current IL, and thereby to reduce the period duration until the period duration TM matches the nominal period duration.

To this end, the regulating arrangement 30 may be in the form of a PI controller, which generates the hysteresis value H on the basis of the nominal period duration value Tnominal and the actual period duration value Tm. Since the time measuring arrangement 20 provides a new period duration value Tm after each period duration of the actuation signal S40, the hysteresis value H is adapted over time in stages, in each case after a period duration.

While, when a PI controller is used, the change in the hysteresis value H is dependent on the difference between the period duration value Tm and the nominal period duration value Tnominal, it is also possible to design the controller 30 such that the hysteresis value is respectively incremented or decremented by firmly prescribed values, in each case depending on whether the actual period duration value Tm is greater than or less than the nominal period duration value Tnominal.

Assuming that the profile of the load current IL, and hence the profile of the current measurement signal S12, are at least approximately triangular in shape, it is also possible for the regulator arrangement 30 provided to be an arithmetic and logic unit which determines the hysteresis value H analytically from the actual period duration value Tm, the nominal period duration value Tnominal and an instantaneous value H1 for the hysteresis value in line with the following relationship:

$$H = H1 \cdot Tnominal/T1 \qquad (1)$$

In this context, H1 denotes the instantaneous hysteresis value, T1 denotes the period duration value T1 associated with this instantaneous hysteresis value H1, and Tnominal denotes the nominal period duration value.

As FIG. 9 shows, when an arithmetic and logic unit of this type is used as regulating arrangement 30 it is possible to achieve the nominal period duration of the actuation signal S40, or the nominal frequency, after just one actuation period of the actuation signal S40.

The inventive current regulator and the inventive current regulating method allow a load current IL through an inductive load to be regulated to a prescribed mean value I_nominal, at which a nominal frequency for the actuation signal is reached after a transient phase. Apart from the transient process, which is comparatively short and, in terms of electromagnetic radiation, thus presents a minor problem, the switching frequency of the switch is regulated to a prescribed value which is dependent on the nominal period duration value. This easily results in narrowband radiated electromagnetic interference, which can be suppressed by taking suitable measures.

The invention claimed is:

1. A method of regulating a current through an inductive load connected to a power supply to a prescribed nominal current value, the method comprising:
   turning on and off the power supply in pulsed fashion, with the power supply being turned on when the current flowing through the load reaches a first limit value which is below the nominal current value by a hysteresis value and with the power supply being turned off when the current reaches a second limit value which is above the nominal current value by the hysteresis value;
   determining a period duration between two successive turn-on or turn-off times;
   comparing the determined period duration with a prescribed period duration; and,
   changing the hysteresis value based on the determined period duration and the prescribed period duration to a changed hysteresis value.

2. The method of claim 1, wherein the changing the hysteresis value step comprises comparing the determined period duration and the prescribed period duration.

3. The method of claim 2, wherein the hysteresis value is fixed at the start of the method to the time taken to turn the power supply on and off for the first time.

4. The method of claim 1, wherein the changing the hysteresis value step comprises using the following relationship to determine the changed hysteresis value:

$$H = H1 \cdot Tnominal/T1;$$

where H denotes the changed hysteresis value, H1 denotes an instantaneous hysteresis value, Tnominal denotes the prescribed period duration and T1 denotes the determined period duration.

5. The method of claim 1, wherein a difference between the determined period duration and the given period duration is determined, and in which the changed hysteresis value is determined on the basis of the determined difference by incrementing or decrementing an instantaneous hysteresis value.

6. An apparatus for regulating a current through an inductive load connected to a supply voltage to a prescribed nominal current value comprising:
   a controllable power supply circuit to which an actuation signal is supplied and which provides the supply voltage depending on the actuation signal;
   a current measuring arrangement configured to measure the current flowing through the load and to provide a current measurement signal;
   an actuating circuit to which a hysteresis value, the current measurement signal and a nominal value which is dependent on the nominal current value are supplied and which provides the actuation signal such that the supply voltage is turned on when the current measurement signal reaches a first limit value which is below the nominal value by the hysteresis value and the supply voltage is turned off when the current measurement signal reaches a second limit value which is above the nominal current value by the hysteresis value;
   a time measuring arrangement configured to determine a period duration for an actuation period in the power supply circuit and to provide a time measurement value;
   a regulator arrangement to which a nominal period duration value and the determined time measurement value are supplied and which provides the hysteresis value based on the nominal period duration value and the determined time measurement value.

7. The apparatus of claim 6, wherein the power supply circuit comprises a voltage source and a switch.

8. The apparatus of claim 7, wherein the switch comprises a semiconductor switching element.

9. The apparatus of claim 6, wherein the current measuring arrangement comprises a measuring resistor connected in series with the load and a measuring amplifier connected to the measuring resistor.

10. The apparatus of claim 6, wherein the regulator arrangement comprises an arithmetic and logic unit which provides the hysteresis value using the following relationship:

$$H = H1 \cdot Tnominal/T1;$$

where H denotes the hysteresis value, H1 denotes an instantaneous hysteresis value, Tnominal denotes the prescribed period duration and T1 denotes the determined period duration.

11. The apparatus of claim 7, wherein the regulator arrangement comprises an arithmetic and logic unit which provides the hysteresis value using the following relationship:

$$H = H1 \cdot Tnominal/T1;$$

where H denotes the hysteresis value, H1 denotes an instantaneous hysteresis value, Tnominal denotes the prescribed period duration and T1 denotes the determined period duration.

12. The apparatus of claim 8, wherein the regulator arrangement comprises an arithmetic and logic unit which provides the hysteresis value using the following relationship:

$$H = H1 \cdot Tnominal/T1;$$

where H denotes the hysteresis value, H1 denotes an instantaneous hysteresis value, Tnominal denotes the prescribed period duration and T1 denotes the determined period duration.

13. The apparatus of claim 9, wherein the regulator arrangement comprises an arithmetic and logic unit which provides the hysteresis value using the following relationship:

$$H = H1 \cdot Tnominal/T1;$$

where H denotes the hysteresis value, H1 denotes an instantaneous hysteresis value, Tnominal denotes the prescribed period duration and T1 denotes the determined period duration.

14. The apparatus of claim 6, wherein the regulator arrangement comprises a PI controller.

15. An apparatus for regulating a current through an inductive load connected to a supply voltage to a prescribed nominal current value comprising:
   a controllable power supply circuit receiving an actuation signal and providing the supply voltage depending on the actuation signal;
   a current measuring circuit providing a current measurement signal based on the current flowing through the load;
   an actuating circuit receiving a hysteresis value, the current measurement signal and a nominal value which is dependent on the nominal current value and providing the actuation signal such that the supply voltage is turned on when the current measurement signal reaches a first limit value which is below the nominal value by the hysteresis value and the supply voltage is turned off when the current measurement signal reaches a second limit value which is above the nominal current value by the hysteresis value;

a time measuring circuit configured to determine a period duration for an actuation period in the power supply circuit and to provide a determined time measurement value;

a regulator circuit receiving a nominal period duration value and the determined time measurement value are supplied and providing the hysteresis value based on the nominal period duration value and the determined time measurement value.

16. The apparatus of claim 15, wherein the power supply circuit comprises a voltage source and a switch.

17. The apparatus of claim 16, wherein the switch comprises a semiconductor switching element.

18. The apparatus of claim 17, wherein the regulator circuit comprises an arithmetic and logic unit which provides the hysteresis value using the following relationship:

$$H = H1 \cdot Tnominal/T1;$$

where H denotes the hysteresis value, H1 denotes an instantaneous hysteresis value, Tnominal denotes the prescribed period duration and T1 denotes the determined period duration.

19. The apparatus of claim 15, wherein the regulator circuit comprises an arithmetic and logic unit which provides the hysteresis value using the following relationship:

$$H = H1 \cdot Tnominal/T1;$$

where H denotes the hysteresis value, H1 denotes an instantaneous hysteresis value, Tnominal denotes the prescribed period duration and T1 denotes the determined period duration.

20. The apparatus of claim 15, wherein the actuating circuit comprises a limit generating circuit subtracting the hysteresis value from the nominal value and adding the hysteresis value to the nominal value and a generating a limit value signal, a comparator receiving the limit value signal and the current measurement signal and generating a control signal and a flip flop receiving the control signal and providing the actuation signal in response to the control signal.

* * * * *